(12) United States Patent
Rohm et al.

(10) Patent No.: US 6,883,808 B2
(45) Date of Patent: Apr. 26, 2005

(54) DRILL-CHUCK JAW WITH HARD-METAL INSERTS

(75) Inventors: Gunter Horst Rohm, Sontheim (DE); Hans-Dieter Mack, Sontheim (DE)

(73) Assignee: Rohm GmbH, Sontheim (DE)

( * ) Notice: Subject to any disclaimer, the term of this patent is extended or adjusted under 35 U.S.C. 154(b) by 131 days.

(21) Appl. No.: 10/303,619

(22) Filed: Nov. 25, 2002

(65) Prior Publication Data

US 2003/0116925 A1 Jun. 26, 2003

(30) Foreign Application Priority Data

Nov. 24, 2001 (DE) .......................................... 101 57 705

(51) Int. Cl.⁷ .............................................. B23B 31/10
(52) U.S. Cl. ........................... 279/60; 279/62; 279/152
(58) Field of Search ............................ 279/60–65, 123, 279/152, 153

(56) References Cited

U.S. PATENT DOCUMENTS

| | | | | |
|---|---|---|---|---|
| 1,633,828 A | * | 6/1927 | Sloan | 279/112 |
| 3,558,146 A | * | 1/1971 | Mayers et al. | 279/28 |
| 4,097,054 A | * | 6/1978 | Derbyshire | 279/64 |
| 4,752,165 A | * | 6/1988 | Wanner | 408/239 R |
| 5,340,128 A | * | 8/1994 | Weiss et al. | 279/60 |
| 6,427,555 B1 | * | 8/2002 | Mack | 76/101.1 |
| 6,648,341 B1 | * | 11/2003 | Gaddis et al. | 279/60 |
| 2003/0066390 A1 | * | 4/2003 | Mack | 76/101.1 |

FOREIGN PATENT DOCUMENTS

| | | | | | |
|---|---|---|---|---|---|
| DE | 3122876 A1 | * | 12/1982 | | B23B/31/00 |
| DE | 3443186 A1 | * | 5/1986 | | B23B/31/04 |
| DE | 3644707 | * | 7/1988 | | B23B/31/04 |
| DE | 29922011 U1 | * | 2/2000 | | B23B/31/10 |
| GB | 370963 | * | 4/1932 | | |

* cited by examiner

*Primary Examiner*—Daniel W. Howell
(74) *Attorney, Agent, or Firm*—Herbert Dubno; Andrew Wilford

(57) ABSTRACT

A drill-chuck jaw hag an elongated metal body formed with a toothed back face and an opposite front face. The body is generally symmetrical to a longitudinal plane bisecting the back and front faces. A pair of hard-metal insert parts fixed to the front face are each formed with a projecting linear edge extending longitudinally parallel to but offset from the plane. The edges symmetrically flank the plane.

17 Claims, 6 Drawing Sheets

DRILL-CHUCK JAW WITH HARD-METAL INSERTS

FIELD OF THE INVENTION

The present invention relates to drill-chuck jaw. More particularly this invention concerns such a jaw with hard-metal inserts.

BACKGROUND OF THE INVENTION

A standard drill chuck has a body centered on and rotatable about an axis and formed with a plurality of axially extending angled guides angularly spaced about the axis. Respective jaws in these guides can be moved between a forward holding position in which they grip a tool and a rear releasing position. Screwthread formations on back edges of the jaws mesh with a threaded sleeve that is rotated relative to the chuck body to advance and retract the jaws. Alternately the guides are formed in a sleeve that rotates relative to the chuck body and the screwthread formations on the jaws mesh with a screwthread on the body for similar action.

Even though the jaws are made of steel, they are typically used to grip tools of similar hardness. Thus it is known to provide special hard-metal, e.g. carbide, inserts in the gripping faces of the jaws to reduce wear of the jaws and thereby prolong the life of the drill or lathe carrying the chuck. This is particularly the case for a hammer drill where the tool is also moved axially as it is rotated.

Such inserts must be mounted very, very solidly on the chuck jaw. Once installed they must be able to withstand considerable lateral forces as the chuck applies torque to the tool, and they must hold even when the entire tool gets fairly hot as is common in machining.

The typical chuck can hold a tool between 1.0 mm and 10.0 mm in diameter, and typically is set to go down to 0.8 mm so that when worn it can still hold a 1.0 mm bit. This can be done with standard chuck jaws by forming their front faces with a small groove, but the typical carbide insert is produced by sintering and cannot be given the desired shape, at least not with a groove of small radius of curvature. Thus it in not possible with insert-type jaws to provide the desired small clearance.

OBJECTS OF THE INVENTION

It is therefore an object of the present invention to provide an improved drill-chuck jaw with a hard-metal insert.

Another object is the provision of such an improved drill-chuck jaw with a hard-metal insert which overcomes the above-given disadvantages, that in which can have the desired small clearance, even though provided with hard-metal inserts.

SUMMARY OF THE INVENTION

A drill-chuck jaw has according to the invention an elongated metal body formed with a toothed back face and an opposite front face. The body is generally symmetrical to a longitudinal plane bisecting the back and front faces. A pair of hard-metal insert parts fixed to the front face are each formed with a projecting linear edge extending longitudinally parallel to but offset from the plane. The edges symmetrically flank the plane.

Such a jaw is particularly suited for use in a hammer drill and has the considerable advantage that the spacing of the actual holding edges can be reduced to a much smaller distance than in jaws with standard carbide inserts. The spacing of the holding edges, which can be smaller than 0.75 mm measured perpendicular to the jaw symmetry plan, and the depth of the groove formed between them can be set at any useable dimension without running up against machining problems. All that is necessary is to properly position the insert parts on the jaw body when welding them in place. The actual construction of the insert parts is simple and standard.

According to the invention each of the edges is formed with at least one crosswise and forwardly open notch. Such a notch reduces the length of the gripping edge so that, with the same gripping force, more pressure is brought to bear per unit of area on the shank of the tool held by the jaw. In addition each of the edges can have beveled or rounded ends. This further aids the jaw edges in biting into the tool shank. The rounded or beveled ends prevent the jaw edges from biting in and forming barbs, in particular during hammer drilling.

The front jaw face according to the invention has a pair of planar facets extending at an obtuse angle to each other. In addition this front face is formed with a groove in which the insert parts are set. The insert parts can be parts longitudinally offset from each other in the groove or transversely adjacent each other in the groove.

BRIEF DESCRIPTION OF THE DRAWING

The above ad other objects, features, and advantages will become more readily apparent from the following description, reference being made to the accompanying drawing in which.

SPECIFIC DESCRIPTION

Figure 1:
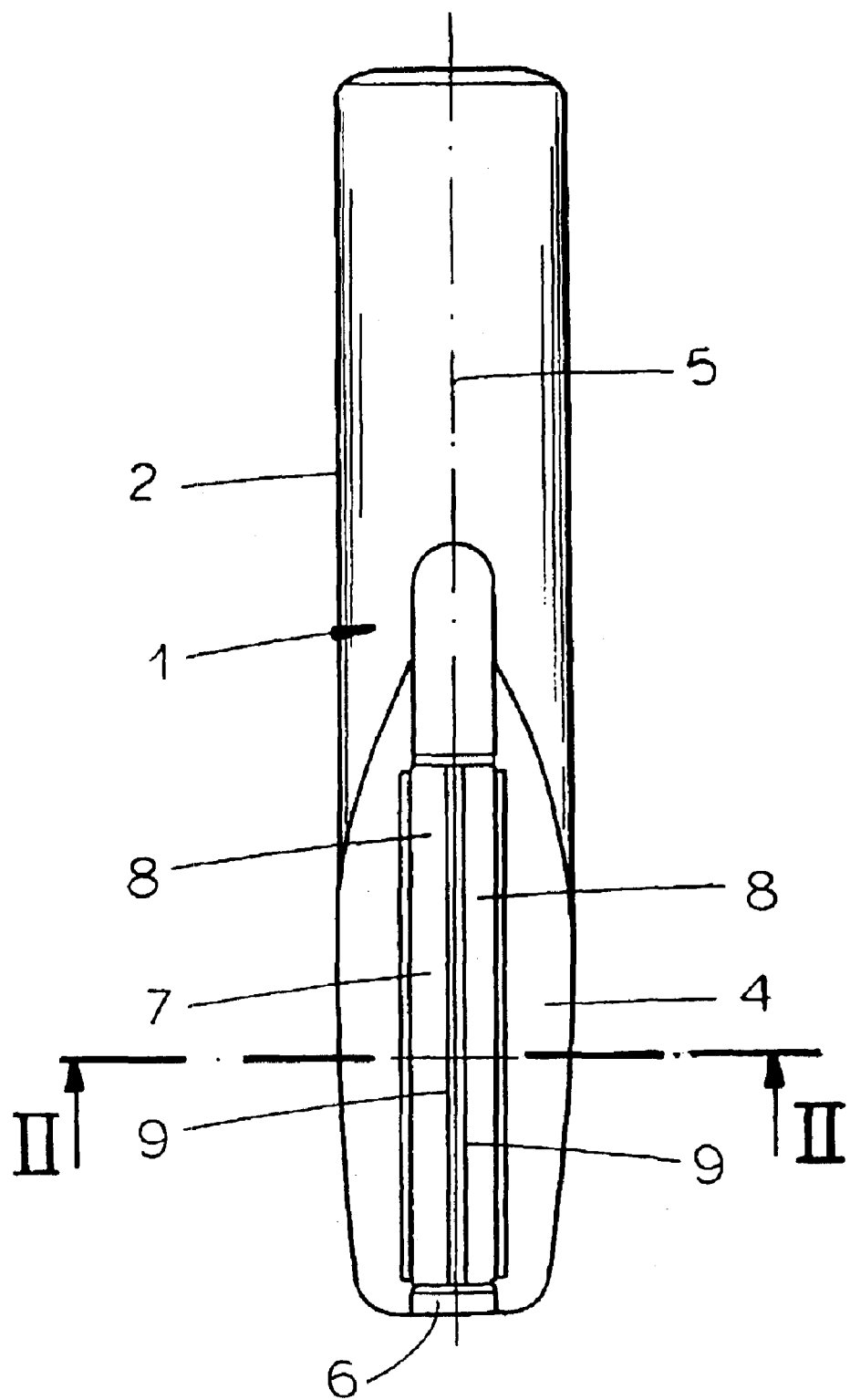
FIG. 1 is a front view of a first drill-chuck jaw according to the invention.

As seen in the drawing, a drill-chuck jaw 1 has an elongated body formed as a steel bar or rod having a back face formed with a row of teeth 3 (FIG. 9 only) and a front face 4 here formed by a pair of planar facets extending at an angle of 120° from each other and angled symmetrically away from a central symmetry plane 5 of the body 2. This plane 5 runs through a longitudinal axis 2A of the body 2 and the face 4 extends at an angle to this axis 2A. The face 4 here is formed with a rectangular section groove 6 that extends along the face 4 and that is centered on the symmetry plane 5. This structure is substantially identical for all embodiments of the invention.

Figure 2:
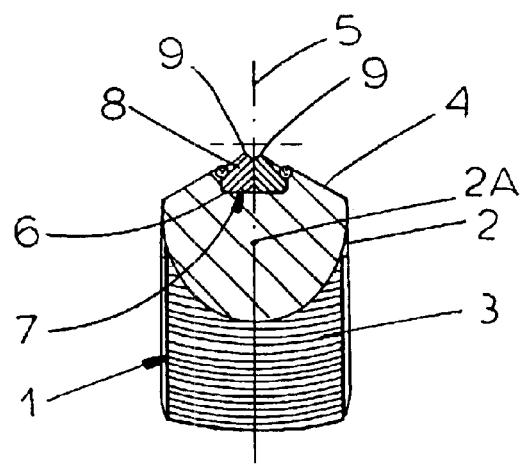
FIG. 2 is a section along line II—II of FIG. 1.

In the arrangement of FIGS. 1 and 2 the groove 6 holds an insert 7 formed by two identical but separate carbide bars or parts 8 that symmetrically flank the plane 5 and that in fact bear on each other at the plane 5. Each bar 8 is formed with a longitudinally extending linear ridge or edge 9 so that the two edges 9 symmetrically flank this plane 5.

Figure 3:
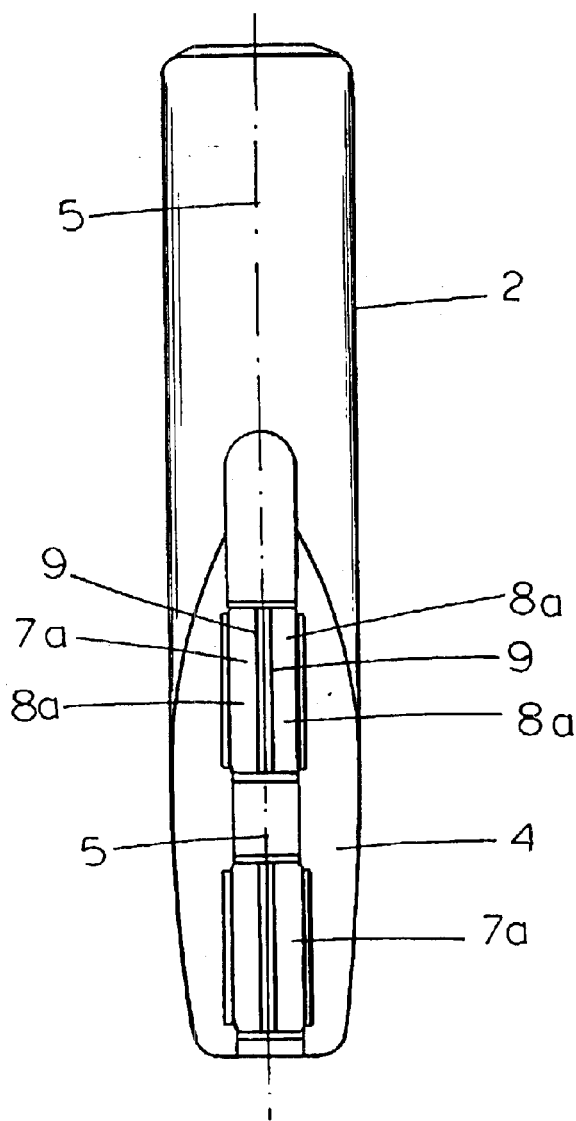
FIG. 3 is a front view of a second jaw in accordance with the invention.

In the arrangement of FIG. 3 there are two longitudinally spaced inserts 7a each formed by a pair of short parts 8a substantially identical to the parts 8 of FIG. 1, but shorter.

Figure 5:
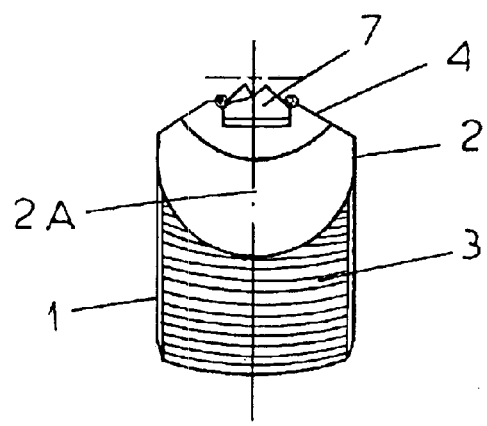
FIG. 5 is an and view of the jaw of FIG. 4.
Figure 4:
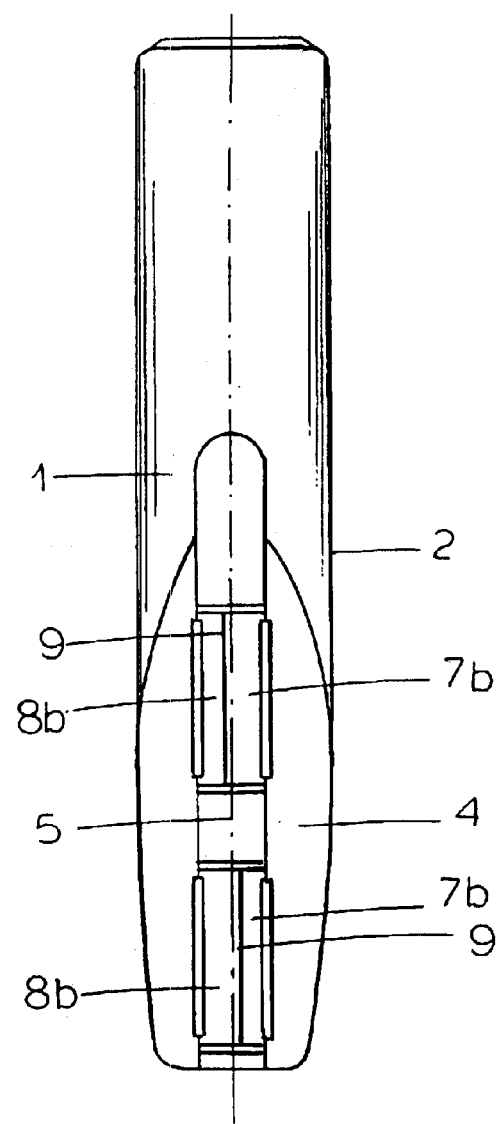
FIG. 4 is a front view of a third jaw according to the invention.
Figure 6:
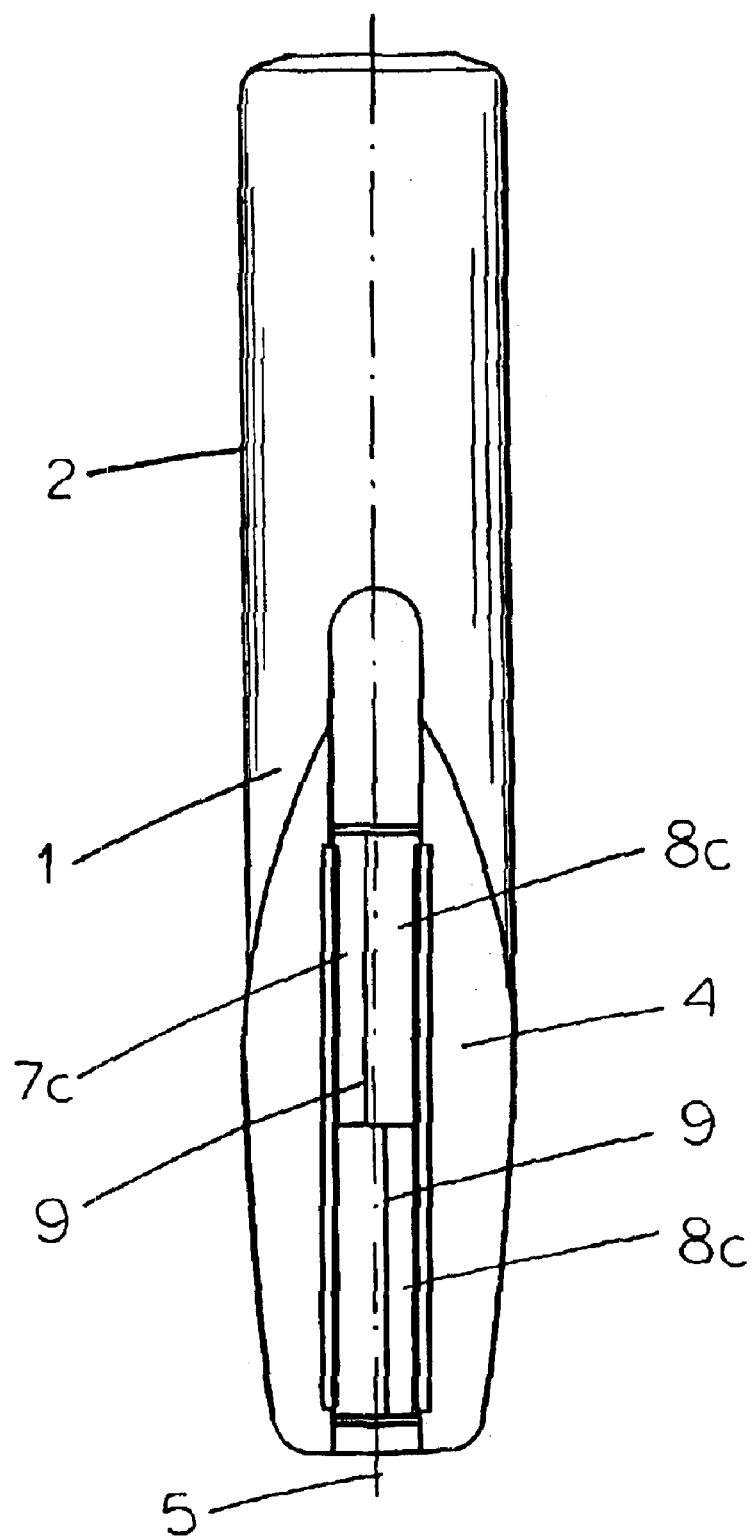
FIG. 6 is a front view of a fourth jaw.

FIGS. 4 and 5 show an arrangement similar to that of FIGS. 2 and 3, but here each of the two axially spaced inserts 7b are formed by a single bar 8b. These barn 8b are identical, but are oppositely mounted in the groove 6 so that the ridge or edge 9 of one of the bars 8b is to one side of the plans 5 and that of the other is to the other side. FIG. 6 shows a similar arrangement, but where two slightly longer bars 8c axially abut each other and form an insert 7c. Once again the bars 8c are oppositely mounted so the edges 9 symmetrically flank the plane 5.

Figure 7:
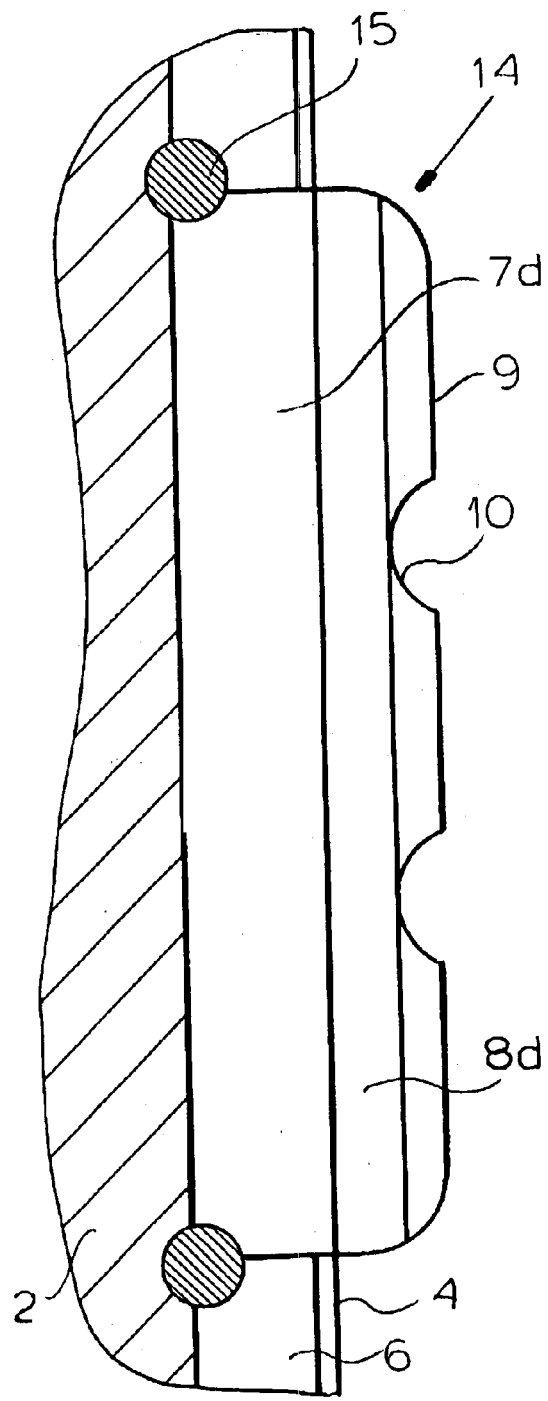
FIGS. 7 and 8 are side views of inserts according to the invention.
Figure 8:
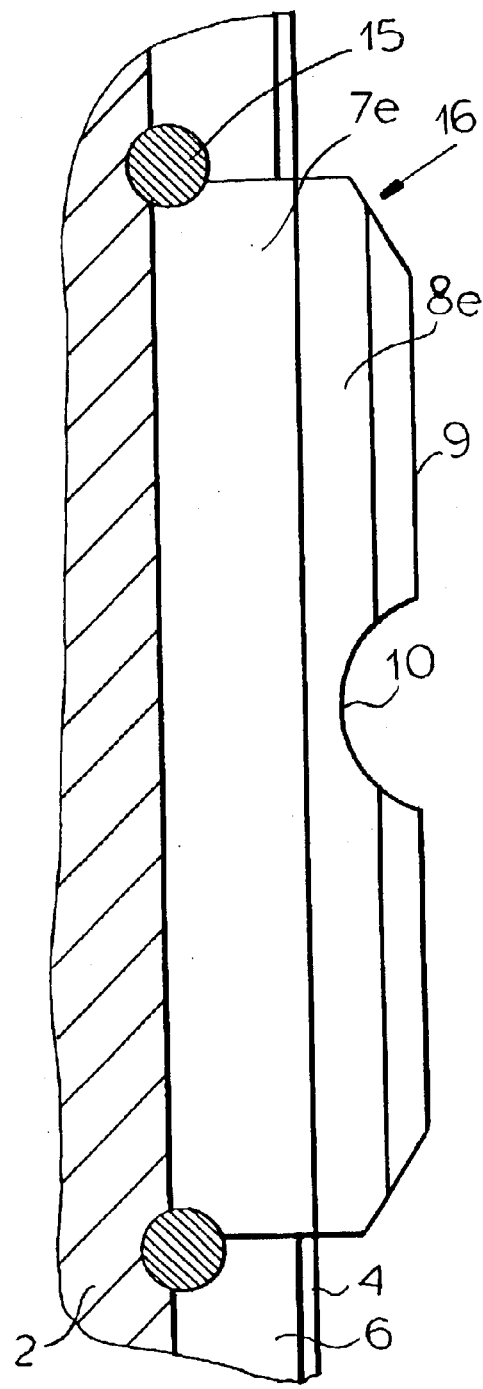

FIG. 7 shows an insert 7d having a bar 8d formed with a pair of crosswise notches 10 interrupting the edge 9 that allows the insert 7d to clamp with great force. Corners 14 of this bar 8d are rounded, and welds 15 secure it in place in the groove 6. In FIG. 8 an insert 7a has a bar 8e formed with a single relief notch 10, and has corners 16 that are chamfered or beveled.

Figure 9:
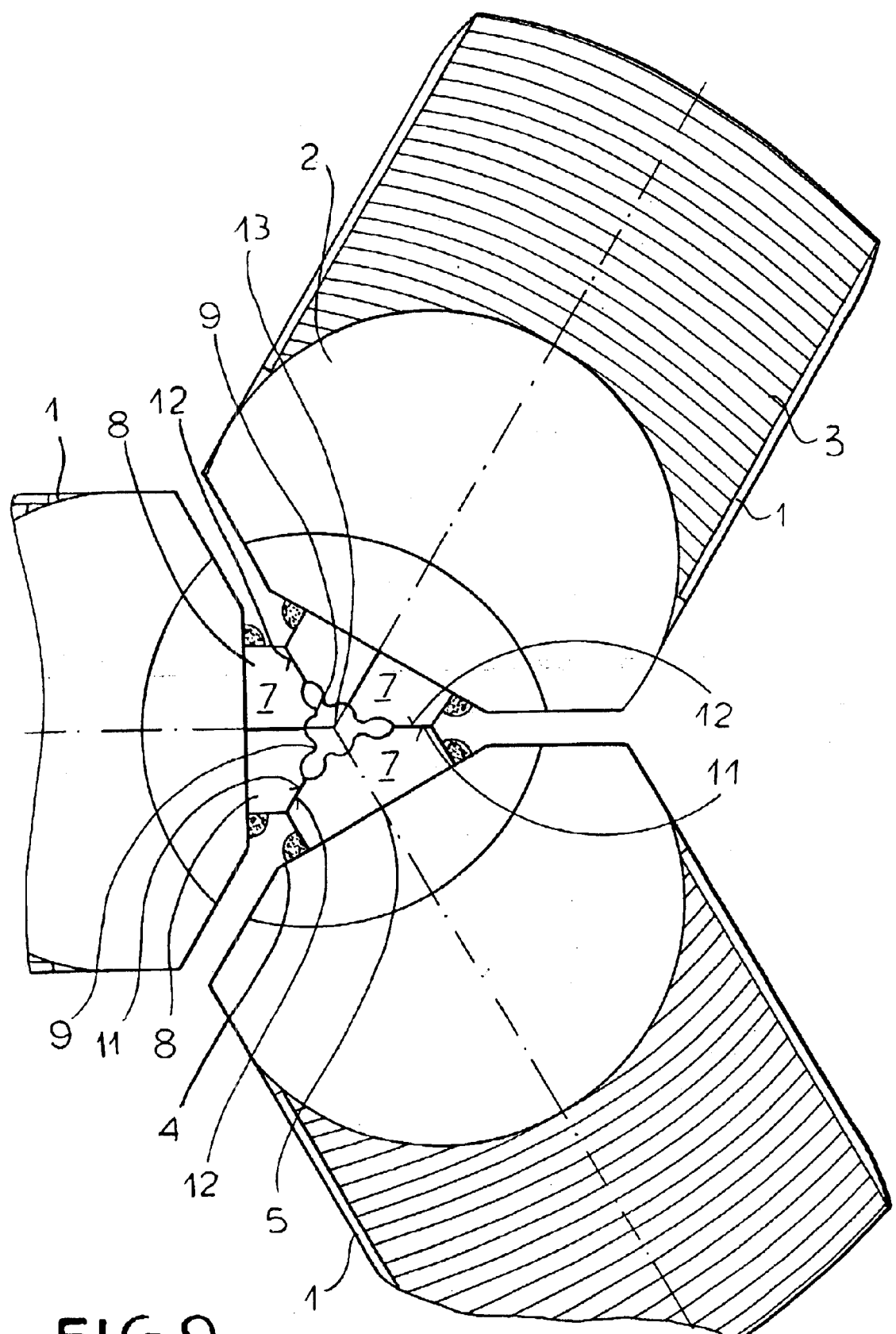
FIG. 9 is an end view of the jaws of FIG. 1 installed in a drill chuck.

FIG. 9 shows how three jaws 1 such as shown in FIGS. 1 and 2 are pressed together at an axis 13 so that angled facets or faces 11 and 12 of the bars 7 sit flatly against each other, to which end they extend at angles of 120° to each other. It is therefore possible for a very small bit shank to be held by the six edges 9. In addition the facets 11 and 12 engage each other before the edges 9 do, so that these edges 9 are not damaged by engagement with each other.

We claim:

1. A drill-chuck jaw comprising:
   an elongated metal body formed with a toothed back face and an opposite front face, the body being generally symmetrical to a longitudinal plane bisecting the back and front faces; and
   a pair of hard-metal insert parts permanently fixed to the front face and each formed with a projecting linear edge extending longitudinally parallel to but offset from the plane, the edges symmetrically flanking the plane.

2. The drill-chuck jaw defined in claim 1 wherein each of the edges is formed with at least one crosswise and forwardly open notch.

3. The drill-chuck jaw defined in claim 1 wherein each of the edges has beveled ends.

4. A drill-chuck jaw comprising:
   an elongated metal body formed with a toothed back face and an opposite front face, the body being generally symmetrical to a longitudinal plane bisecting the back and front faces; and
   a pair of hard-metal insert parts fixed to the front face and each formed with a projecting linear edge extending longitudinally parallel to but offset from the plane, the edges symmetrically flanking the plane and having rounded ends.

5. A drill-chuck jaw comprising:
   an elongated metal body formed with a toothed back face and an opposite front face, the body being generally symmetrical to a longitudinal plane bisecting the back and front faces, the front face having a pair of planar facets extending at an obtuse angle to each other; and
   a pair of hard-metal insert parts fixed to the front face and each formed with a projecting linear edge extending longitudinally parallel to but offset from the plane, the edges symmetrically flanking the plane.

6. A drill-chuck law comprising:
   an elongated metal body formed with a toothed back face and an opposite front face, the body being generally symmetrical to a longitudinal plane bisecting the back and front faces, the front face being formed with a groove in which the insert parts are set; and
   a pair of hard-metal insert parts fixed to the front face and each formed with a projecting linear edge extending longitudinally parallel to but offset from the plane, the edges symmetrically flanking the plane.

7. The drill-chuck jaw defined in claim 6 wherein the insert parts are longitudinally offset from each other in the groove.

8. The drill-chuck jaw defined in claim 6 wherein the insert parts are transversely adjacent each other in the groove.

9. A drill-chuck law comprising:
   an elongated metal body formed with a toothed back face and an opposite front face, the body being generally symmetrical to a longitudinal plane bisecting the back and front faces; and
   a pair of hard-metal insert parts fixed to the front face and each formed with a projecting linear edge extending longitudinally parallel to but offset from the plane, the edges symmetrically flanking the plane at a spacing of at most 0.75 mm.

10. The drill-chuck jaw defined in claim 1 wherein the insert parts are welded to the bodies.

11. The drill-chuck jaw defined in claim 4 wherein each of the edges is formed with at least one crosswise and forwardly open notch.

12. The drill-chuck jaw defined in claim 5 wherein each of the edges is formed with at least one crosswise and forwardly open notch.

13. The drill-chuck jaw defined in claim 5 wherein each of the edges has beveled ends.

14. The drill-chuck jaw defined in claim 6 wherein each of the edges is formed with at least one crosswise and forwardly open notch.

15. The drill-chuck jaw defined in claim 6 wherein each of the edges has beveled ends.

16. The drill-chuck jaw defined in claim 9 wherein each of the edges is formed with at least one crosswise and forwardly open notch.

17. The drill-chuck jaw defined in claim 9 wherein each of the edges has beveled ends.

* * * * *